Patented Apr. 17, 1945

2,373,870

UNITED STATES PATENT OFFICE 2,373,870

ORGANIC NITROGEN-CONTAINING COMPOUNDS AND PROCESSES FOR THEIR PRODUCTION

Donald Drake Coffman, Lindamere, and Witty Lysle Alderson, Jr., Wilmington, Del., assignors to E. I. du Pont de Nemours & Company, Wilmington, Del., a corporation of Delaware No Drawing. Application October 21, 1942, Serial No. 462,818

2 Claims. (Cl. 260—513)

This invention relates to monoamines in which the organic radicals attached to the nitrogen atom consist of hydroxy-alkyl and methylenesulfonic groups and processes for their production and use.

Certain aminomethanesulfonic acids have been described in the literature. These compounds are, however, restricted in their use because of their low solubility in water. This lack of solubility has been such a serious disadvantage that compounds of this general type have achieved but relatively minor employment in the industrial arts.

It is an object of this invention to produce aminomethanesulfonic acids which are readily soluble in water. A further object is to produce a new class of monoamines having a multitude of uses in industry. A further object is to produce a class of compounds which are of value as textile sizes, softeners for plastics, adhesives, surface-active compounds, pharmaceuticals, flame retardants, etc. A still further object is to improve the solubility of prior art aminomethanesulfonic acids by introducing therein in a simple and economical manner water solubilizing groups. Additional objects will become apparent from a consideration of the following description and claims.

These objects are attained in accordance with the present invention wherein hydroxyalkylamines containing at least one amino hydrogen are reacted with a carbonyl addition product of a bisulphite and a ketaldone. In a more restricted sense this invention is concerned with a process wherein a hydroxyalkylamine containing at least one amino hydrogen and having the hydroxyl group separated from the amino group by at least two carbon atoms is reacted at elevated temperatures with at least one equivalent of a carbonyl addition product of an alkali metal bisulphite and a ketaldone. In a still more restricted sense this invention pertains to the reaction at elevated temperatures of a beta-hydroxyalkylamine containing at least one amino hydrogen with at least one equivalent of a carbonyl addition product of an alkali metal bisulphite and a ketaldone. In its preferred embodiment this invention is concerned with the reaction of an ethanolamine containing at least one amino hydrogen with at least one equivalent of an alkali metal salt of formaldehyde-bisulfite. An additional embodiment of this invention concerns the operation of the foregoing processes under controlled conditions and with certain proportions of specified reactants. A further embodiment of this invention is directed to products produced in accordance with the previously described processes.

In accordance with this invention, a hydroxyalkylamine (preferably a beta-hydroxyalkylamine) having at least one amino hydrogen and having the hydroxy group separated from the nitrogen atom of the amine by at least two carbon atoms is reacted at elevated temperatures with a carbonyl addition product of a bisulphite and a ketaldone. This reaction is advisably carried out at temperatures below 200° C.

The preferred process of this invention is carried out substantially as follows: Equimolar amounts of a beta-hydroxyalkylamine containing at least one amino hydrogen, for example, monoethanolamine or diethanolamine, and sodium formaldehydebisulfite are allowed to react in aqueous solution for 12 hours at room temperature. The solution is then concentrated by evaporation of the water at steam bath temperature until the solution has acquired a syrupy consistency. An equal volume of 95% ethyl alcohol is added in order to precipitate any unreacted sodium formaldehyde-bisulfite which may be present. After filtering off the insoluble material, the clear solution is evaporated to dryness under reduced pressure. The product thus obtained consists of a sodium N-(beta-hydroxyalkyl)-aminoethanesulfonate if a mono-(beta-hydroxyalkyl) amine was used, or of a sodium N,N-bis-(beta-hydroxyalkyl) aminomethanesulfonate if a bis-(beta-hydroxyalkyl) amine was used.

Another modification consists in reacting a hydroxyalkyl primary amine, for example monoethanolamine, with two molar equivalents of sodium formaldehyde-bisulfite in aqueous solution for 2 hours at 90-100° C. and then removing the water under reduced pressure. The product obtained in this manner consists of a disodium N-(hydroxyalkyl)-imino-bis-(methanesulfonate).

The sodium formaldehyde-bisulfite used can be prepared by well known procedures from technical grade formaldehyde and sodium bisulfite as described in Example I. Technical grades of primary or secondary hydroxyalkylamines can also be used.

The following examples in which the amounts are expressed in parts by weight will serve to illustrate the invention more specifically.

Example I

A solution of 134 parts of sodium formaldehyde-bisulphite prepared by dissolving 104 parts of sodium bisulfite and 81 parts of 37% aqueous formaldehyde in 110 parts of water is mixed with 61 parts of monoethanolamine. The solution is heated for 2 hours on a steam bath after which the water is removed preferably under reduced pressure. The product obtained in this manner consists of 156 parts of sodium N-(beta-hydroxyethyl)-aminomethanesulfonate.

Analysis of this salt gave the following results: Calculated for $C_3H_8O_4SNNa$: nitrogen, 7.9; found: nitrogen, 7.73.

Example II

A solution of 134 parts of sodium formaldehyde-bisulfite in 150 parts of water is prepared as described in Example I. To this solution is added 105 parts of diethanolamine. After standing at 25-30° C. for 12 hours, the solution is concentrated on a steam bath until it acquires a syrupy consistency. An equal volume of 95% alcohol is added in order to precipitate any unreacted sodium formaldehyde-bisulfite. The solution is filtered, and then evaporated to dryness under reduced pressure. The product consists of 190 parts of sodium N,N-bis-(beta-hydroxyethyl)-aminomethanesulfonate.

Analysis of this salt gave the followings results: Calculated for $C_5H_{12}O_5SNNa$: nitrogen, 6.35; found, nitrogen, 6.12.

Example III

A solution of 134 parts of sodium formaldehyde-bisulfite and 35.5 parts of monoethanolamine in 110 parts of water is heated for 2 hours at 90-100° C., filtered, and then evaporated to dryness under reduced pressure. The product consists of 95 parts of crude disodium N-(beta-hydroxyethyl)-imino-bis-(methanesulfonate). The crude material analyzed as follows: Calculated for $C_4H_9O_7S_2NNa_2$: N, 4.8; S, 22. Found: N, 5.67; S, 20.35.

It is to be understood that the preceding examples are descriptive merely of a few of the many embodiments of this invention. They may be varied widely with respect to the individual reactants, the proportions thereof and the conditions of reaction without departing from the scope hereof.

The foregoing examples illustrate the preferred embodiment of this invention pertaining to beta-hydroxyalkylaminemethanesulfonates. Other compounds of this category are also included within the preferred embodiment and they may be produced by reacting a variety of beta-hydroxyalkylamines having at least one amino hydrogen with a carbonyl addition product of an alkali metal bisulfite and an aldehyde or a ketone. In the secondary embodiment hydroxyalkylamines wherein the hydroxyl group is not in the beta position may be employed.

By way of typical examples the following amines may be cited as suitable for carrying out this invention: 2-hydroxyethylamine, bis(2-hydroxyethyl)amine, 2-hydroxypropylamine, bis(2-hydroxypropyl)amine, 2,3-dihydroxypropylamine, bis(2,3-dihydroxypropyl)amine, 1,3-dihydroxy-2-aminopropane, bis(1,3 - dihydroxy - 2 - propyl) amine, 1-chloro-3-hydroxyaminopropane, bis(1-chloro-3-hydroxy-2 - propyl)amine. Beta - hydroxyalkylamines are preferred because they are cheaper and more readily available. Alpha-hydroxyamines are generally unsuitable due to their chemical instability.

Although the alkali metal salts of the formaldehyde-bisulfite addition product are preferred, the carbonyl addition products of other carbonyl compounds with metal bisulfites can also be used. Thus the alkali metal bisulfite addition products of acetaldehyde, propionaldehyde, butyraldehyde, isobutyraldehyde, benzaldehyde, cyclohexanone, acetone and acetophenone react with hydroxyalkylamines having an amino hydrogen to give monoamines containing hydroxyalkyl groups and substituted methylene-sulfonic groups. For reasons of economy and ease of operation sodium formaldehyde-bisulfite is preferred above all others.

The amount of each reactant used will depend on the hydroxyalkylamine and the product desired. Thus, with secondary hydroxyalkylamines, that is, amines containing only a single amino hydrogen, it is generally preferable to use equimolar amounts of amine and alkali-metal aldehyde or ketone-bisulfites. However, when primary hydroxyalkylamines, that is, amines containing two amino hydrogens, are used, equimolar amounts of the reactants will give salts of N-hydroxyalkylaminomethanesulfonic acids, while the use of two molar amounts of an alkali metal aldehyde or ketone bisulfite per molar amount of primary amine results in the formation of salts of N - hydroxyalkyl - imino-bis-(methanesulfonates).

The length of time and the temperature at which the process of this invention is carried out depend on the concentration of the reactants, their reactivity and stability. A reaction time of at least 0.1 hour at temperatures in the range of 0-200° C. is usually adequate. However, the preferred conditions are from 1 to 12 hours at 25 to 100° C., the lower temperature limit corresponding to a longer reaction time. It is usually preferred to carry out the process of this invention in aqueous solution, and the concentration of the reactants will depend primarily on their solubility. However, other solvents such as aqueous alcohol, aqueous dioxane and the like may be used, especially if the reactants have poor solubility in water alone. In some cases no solvent is necessary.

The acids derived from the salts produced by this invention can be obtained by careful addition of volatile mineral acids, such as hydrochloric acid in the calculated amounts sufficient to react with the alkali metal present, followed by evaporation to dryness under reduced pressure. The free hydroxyalkylaminomethanesulfonic acids obtained in this manner can be purified by extraction methods, and can be converted to amine salts, esters, heavy metal salts and the like.

The products of this invention are useful intermediates in the preparation of water-soluble compounds such as textile sizes, Cellophane softeners, adhesives, surface-active compounds, pharmaceuticals and the like. They can furthermore be used as flame retardants, particularly for fabrics composed of polyamide fibers.

The word "ketaldone" when used throughout the present specification and claims is understood to mean an aldehyde or a ketone.

As many apparently widely different embodiments of this invention may be made without departing from the spirit and scope thereof, it is to be understood that the invention is not limited to the specific embodiments thereof except as defined in the appended claims.

We claim:
1. Disodium N-(beta-hydroxyethyl)imino-bis-(methanesulfonate).
2. A process which comprises heating an aqueous solution of monoethanolamine and at least two equivalents of sodium formaldehyde bisulfite.

DONALD DRAKE COFFMAN.
WITTY LYSLE ALDERSON, Jr.